UNITED STATES PATENT OFFICE.

CHARLES G. AM ENDE, OF HOBOKEN, NEW JERSEY.

IMPROVEMENT IN GLYCERO-FERRATED COTTON.

Specification forming part of Letters Patent No. 211,206, dated January 7, 1879; application filed September 30, 1878.

*To all whom it may concern:*

Be it known that I, CHARLES G. AM ENDE, of Hoboken, Hudson county, New Jersey, have invented an Improved Preservative Cotton, of which the following is a specification:

The improvement consists in impregnating cotton (woven or in bulk) with subsulphate of iron and glycerine, in the manner hereinafter described, for the purpose of preserving animal and vegetable matter from decay.

The prepared cotton heretofore used answers well for cooler climates; but for shipment in tropical regions and in heat the present invention offers decided advantages. It enables me to employ the exceedingly powerful and effective antiseptic property of an astringent metallic salt without the deteriorating influences that would result from its direct application as a curing material or for packing.

The functions of the glycerine are important in various directions. If cotton were saturated with a solution of subsulphate of iron without glycerine, and then exposed to the influences of air and light for drying, &c., the subsulphate would decompose with a partial dis-oxidation into sulphate of iron and free sulphuric acid. As a consequence of this decomposition the threads of the cotton would be destroyed, the cloth often appearing as if rotten—at least it always tears easily, and becomes in a very short time unfit for use. With the decomposition of the subsulphate its protective and beneficial effects are lost, and the entire work and material are wasted. The glycerine enables me to prevent this decomposition of the iron salt and the disadvantages resulting therefrom. Its preserving properties, combining with those of the iron salt, produce a marked increase of effect. It aids and increases the germ-filtering properties of the cotton. Cotton thus prepared stands washing, and may be used for the same purpose over and over again. The iron salt remains most evenly divided through a very large quantity of covering material, while otherwise it has the tendency and does concentrate in some places more than in others.

I produce the improved ferrated cotton as follows: I first prepare a solution of one part of the subsulphate of iron and two parts of glycerine in one hundred and fifty parts of water. Into this as much cotton cloth or fiber is steeped as the mixture will saturate, averaging about sixty parts by weight. After perfect saturation and expression of surplus solution, the cotton is exposed to a current of dried air, and when sufficiently dried becomes ready for use.

If it should become desirable to retain the cotton more moist, some more glycerine may be added; or, to attain a higher degree of antiseptic power, the proportion of the iron salt may correspondingly be increased. Finally, as the tersulphate of iron produces an effect almost equal to that of the subsulphate in all the different directions, the subsulphate may be more or less replaced by the tersulphate; but at present I prefer to follow the above-given directions as giving most satisfaction.

The cotton thus treated is far superior to any substance heretofore used for preserving any animal or vegetable matter from decay, especially for transporting beef in hot climates, as the chemical treatment of the cotton renders it astringent, and as there is nothing used in said treatment which is liable to coagulate albumen in solution or otherwise.

I am aware that cotton has, previous to my invention, been saturated with subsulphate of iron; also, that cotton has been saturated with glycerine. This I do not claim; but I do claim—

Cotton fabric or fiber impregnated with a mixture of subsulphate of iron and glycerine, substantially as specified.

CHAS. G. AM ENDE.

Witnesses:
T. B. MOSHER,
F. V. BRIESEN.